US006560671B1

United States Patent
Samra et al.

(10) Patent No.: US 6,560,671 B1
(45) Date of Patent: May 6, 2003

(54) METHOD AND APPARATUS FOR ACCELERATING EXCHANGE OR SWAP INSTRUCTIONS USING A REGISTER ALIAS TABLE (RAT) AND CONTENT ADDRESSABLE MEMORY (CAM) WITH LOGICAL REGISTER NUMBERS AS INPUT ADDRESSES

(75) Inventors: Nicholas G. Samra, Austin, TX (US); Jacob Doweck, Haifa (IL)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 09/659,237

(22) Filed: Sep. 11, 2000

(51) Int. Cl.[7] .................... G06F 12/00; G06F 13/00; G06F 9/315
(52) U.S. Cl. .................. 711/108; 711/165; 711/202; 711/206; 712/217
(58) Field of Search ................ 711/108, 210, 711/202, 206, 207, 165; 712/217, 218

(56) References Cited

U.S. PATENT DOCUMENTS

| | | | | |
|---|---|---|---|---|
| 5,546,597 A | * | 8/1996 | Martell et al. | 712/217 |
| 5,644,746 A | * | 7/1997 | Holt et al. | 712/217 |
| 6,094,716 A | * | 7/2000 | Witt | 712/23 |
| 6,101,597 A | * | 8/2000 | Colwell et al. | 712/218 |

* cited by examiner

Primary Examiner—Glenn Gossage
(74) Attorney, Agent, or Firm—Blakely, Sokoloff, Taylor & Zafman LLP

(57) ABSTRACT

An apparatus, system and method for accelerating exchange (XCHG) instructions in a processor using a register alias table (RAT) data array and a content addressable memory (CAM) to handle register renaming. The RAT has at least one read port, at least one write port, and a plurality of address entries. The CAM has at least one read address, at least one write address, and a plurality of swap addresses. A plurality of logical register numbers are used as CAM input addresses to the RAT, and the operation of the CAM is completed in a first phase and a second phase of a clock cycle. The logical register numbers that match a pair of input swap addresses are interchanged.

24 Claims, 5 Drawing Sheets

Initial State (400)

| | CAM Bits | Physical reg. # |
|---|---|---|
| r0 | 000 | p56 |
| r1 | 001 | p55 |
| r2 | 010 | p57 |
| r3 | 011 | |
| r4 | 100 | |
| r5 | 101 | |
| r6 | 110 | p72 |
| r7 | 111 | |

After ADD instruction (410)

| | CAM Bits | Physical reg. # |
|---|---|---|
| r0 | 000 | p81 |
| r1 | 001 | p55 |
| r2 | 010 | p57 |
| r3 | 011 | |
| r4 | 100 | |
| r5 | 101 | |
| r6 | 110 | p72 |
| r7 | 111 | |

After XCHG instruction (420)

| | CAM Bits | Physical reg. # |
|---|---|---|
| r3 | 011 | p81 |
| r1 | 001 | p55 |
| r2 | 010 | p57 |
| r0 | 000 | |
| r4 | 100 | |
| r5 | 101 | |
| r6 | 110 | p72 |
| r7 | 111 | |

After SUB instruction (430)

| | CAM Bits | Physical reg. # |
|---|---|---|
| r3 | 011 | p81 |
| r1 | 001 | p55 |
| r2 | 010 | p82 |
| r0 | 000 | |
| r4 | 100 | |
| r5 | 101 | |
| r6 | 110 | p72 |
| r7 | 111 | |

Figure 4

METHOD AND APPARATUS FOR ACCELERATING EXCHANGE OR SWAP INSTRUCTIONS USING A REGISTER ALIAS TABLE (RAT) AND CONTENT ADDRESSABLE MEMORY (CAM) WITH LOGICAL REGISTER NUMBERS AS INPUT ADDRESSES

BACKGROUND OF THE INVENTION

1. Field of the Invention

The invention relates to handling of exchange (XCHG) instructions, and more particularly to accelerating XCHG instructions in a processor by a content addressable memory implementation.

2. Background Information

Many instruction set architectures (ISAs) contain an XCHG instruction. An XCHG instruction exchanges data contents between two registers, i.e. a source register and a destination register. In architectures that use a stack-based register file, such as the IA-32 (Intel® Architecture) floating point instruction set, the XCHG instruction is used frequently. In this case, compilers use the XCHG instruction to move data from a given register to the top-of-stack (TOS) position. Once moved, the data is used in a subsequent operation. This is done because many of the instructions implicitly reference the TOS register. Therefore, it is necessary for the data to be re-located to the TOS register before the operation on that data can proceed.

The basic method of executing the XCHG instruction is to read both registers from the register file (RF), and then write back each data contained in the original registers to the alternate register from where it was read. For example, if register 0 (r0) contained data value A, and register 3 (r3) contained data value B, then the instruction XCHG r0,r3 would place data value B in r0 and data value A in r3. Any subsequent instructions that were necessary to access either r0 or r3 would need to stall at dispatch until the XCHG instruction had completed execution.

An improvement in the performance of most type of instructions including XCHG instructions was realized through the concept of register renaming. Register renaming maps the logical registers of each instruction onto a larger set of physical registers. The unit that performs the logical to physical mapping is commonly referred to as the register alias table (RAT). The destinations of the XCHG instruction can be mapped to different physical registers (an example of nomenclature would be physical register #78 or p78) other than the sources. Therefore, the need for dispatching stalls is eliminated. FIG. 1 illustrates an example of a RAT and an RF structure before and after a XCHG r0,r3 instruction.

Other optimizations include attempts to re-map the renamed registers without physically moving the data. One example requires one or more additional pipeline stages to accomplish re-mapping. This mitigates performance gain achieved by eliminating a data transfer. Another example is to swap the contents of the RAT entries corresponding to the logical registers of the XCHG instruction. This example can be very expensive in terms of implementation. This is due to the RAT entry, not only containing the physical register number, but often containing several status fields related to the logical register and sometimes even embedded logic, such as tag comparators.

BRIEF DESCRIPTION OF THE DRAWINGS

The embodiments are illustrated by way of example and not by way of limitation in the figures of the accompanying drawings in which like references indicate similar elements. It should be noted that references in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments," are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

FIG. 4 illustrates states of a RAT after ADD, XCHG, and SUB instructions using a CAM mechanism in accordance with an embodiment of the invention.

DETAILED DESCRIPTION

The invention generally relates to a method and apparatus for accelerating an exchange (XCHG) instruction by using a content addressable memory (CAM) to handle renaming. In several embodiments, an entry-swapping CAM mechanism is used to accelerate XCHG instructions. Referring to the figures, exemplary embodiments of the invention will now be described. The exemplary embodiments are provided to illustrate the invention and should not be construed as limiting the scope of the invention.

Figure 1:
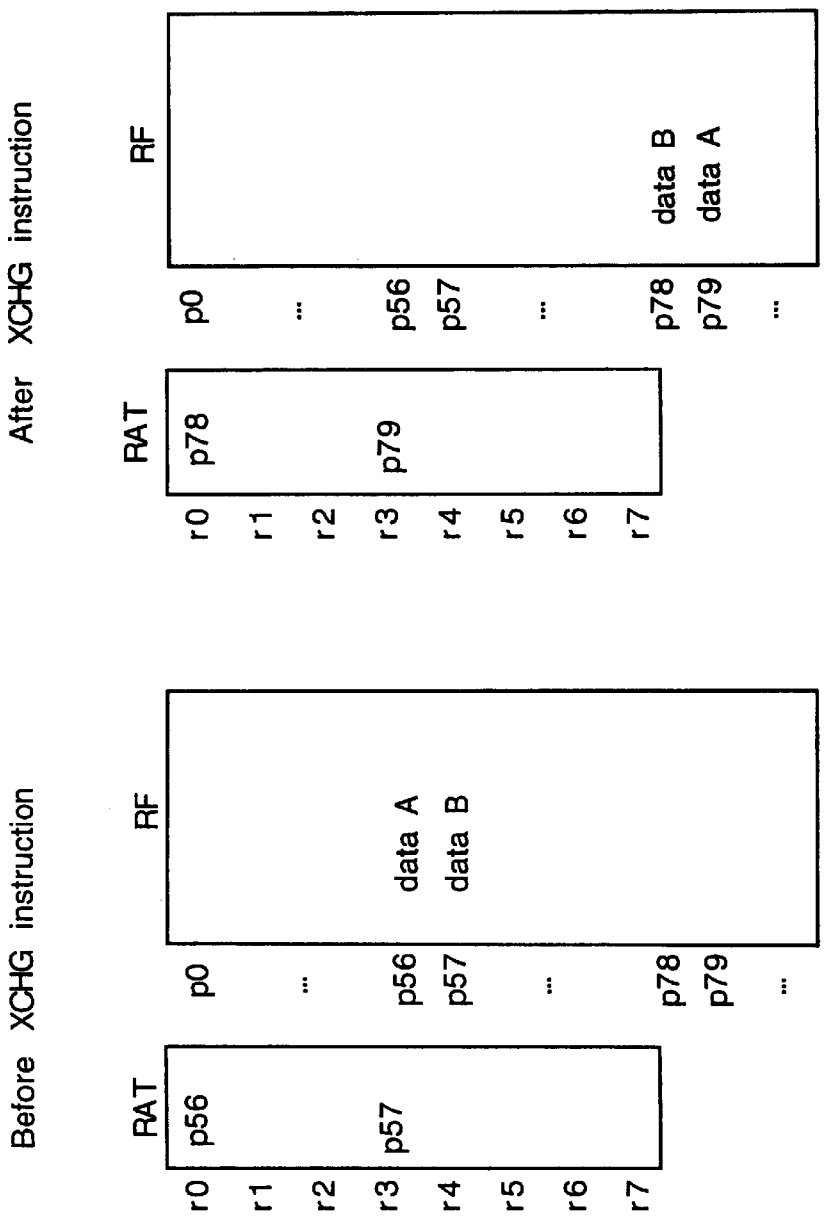
FIG. 1 illustrates a register alias table (RAT) and register file (RF) before and after execution of a basic XCHG instruction.
Figure 2:
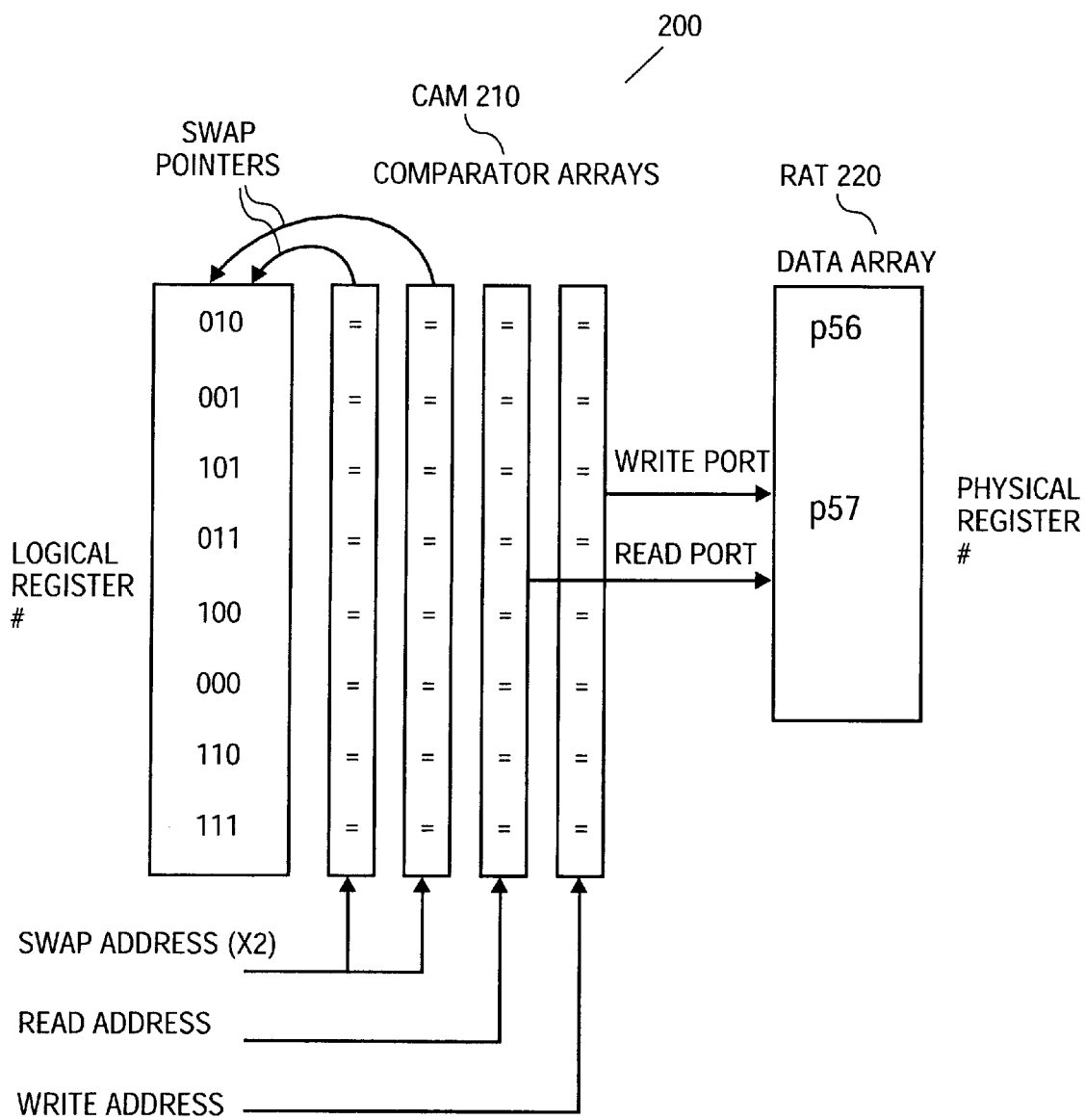
FIG. 2 illustrates an apparatus in accordance with an embodiment of the invention including an entry swapping content addressable memory (CAM) array with 1 read, 1 write and an 8-entry RAT.

FIG. 2 illustrates an embodiment of the invention comprising device 200 that includes entry-swapping CAM 210. Device 200 further includes register alias table (RAT) 220. A CAM, such as CAM 210, is a storage array used to find the location of a particular stored value. The CAM, by comparing the input against the data memory, determines if an input value matches one or more values stored in the array. Typically, a match, when it exists, is found within one clock cycle. Unlike random access memory (RAM), a CAM does not have a limitation of fixed data size. In a RAM, the number of address lines limits the data size. A CAM does not use an address bus to read a location. To find a match of an 8-bit value in 1024 locations, an 8-bit bus on the input is typically required. Upon finding the data in the CAM, a match signal is activated. The output is the address of the matching data. Since a CAM does not need address lines to find data (read mode), the size of the memory can be increased. The width is determined by the storage and comparator size. The core of a CAM has a storage location and a comparator between the storage location value and the input data.

Device 200 illustrated in FIG. 2 allows for maximum performance gain being accomplished for an XCHG instruction with minimal hardware cost. Instead of indexing a register alias table (RAT) with logical register numbers, RAT 220 is accessed as a CAM structure. Here, the logical register numbers act as CAM 210 input addresses. This is also applied for both read and write ports of RAT 220. Upon completion of the comparator phase of CAM 210, CAM 210's address entries may then be swapped with one another to accomplish the functionality of a XCHG instruction, where the comparator arrays also determine which entries to swap. This allows XCHG instructions to be executed in minimal time while being dispatched in parallel with other instructions.

Figure 3:
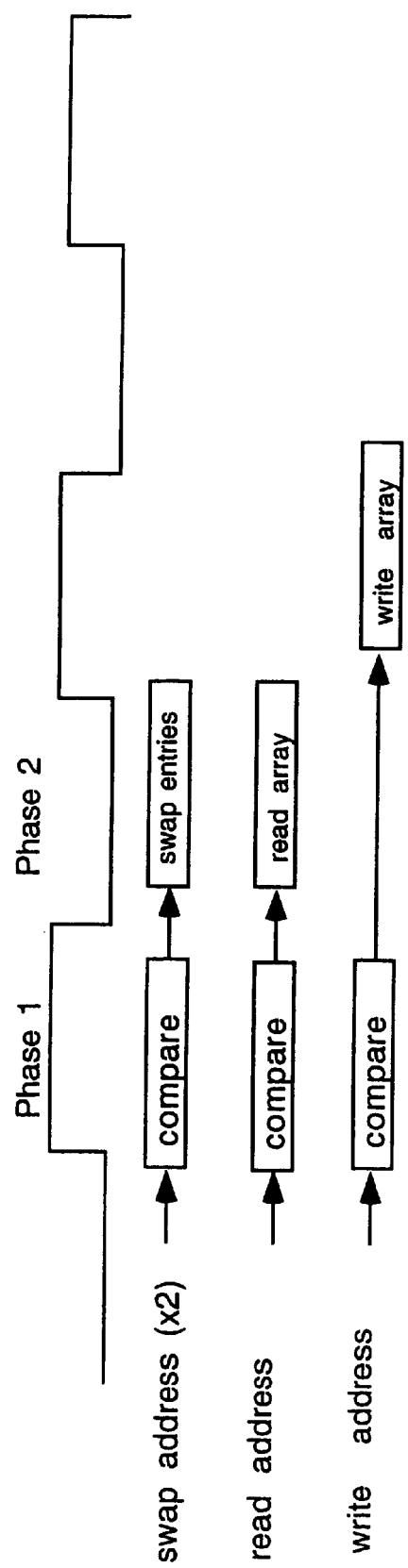
FIG. 3 is a sample timing diagram for the execution of an entry swap in accordance with an embodiment of the invention.

FIG. 2 illustrates an embodiment having 1 read and 1 write for 8-entry RAT 220. Other embodiments can be extended to include multiple read/write/swap ports and any number of RAT entries. An illustrative timing diagram for states of CAM 210 and RAT 220 in accordance with the embodiment illustrated in FIG. 2 is shown in FIG. 3. FIG. 3 demonstrates the comparator functionality of using the entry-swapping CAM mechanism to accomplish a XCHG instruction. It should be noted that other embodiments are not limited to the timing as illustrated in FIG. 3. During phase 1, the comparator arrays are enabled to compare the read, write, and swap addresses for instructions being dispatched during this cycle. During phase 2, the results of the comparators are used to simultaneously read RAT 220's data array (containing the physical register number) and to swap the logical register numbers of the two entries indicated by the swap addresses. Upon completion of the swap, RAT 220 has effectively executed a "zero-cycle" XCHG instruction. The results of the XCHG instruction will affect the instructions that are dispatched during the next clock cycle. The timing of the entry-swapping CAM mechanism allows for a fully-pipelined rename mechanism while still integrating to a data array that is read from, and written to, during different phases of the clock.

For ease of understanding, FIG. 4 illustrates an example of an embodiment using the entry-swapping CAM mechanism to perform, in order, ADD destination, source (addition), XCHG destination, source, and SUB destination, source (subtraction) instructions. The instructions operate on the specified registers as follows:

ADD r0, r2
XCHG r0, r3
SUB r0, r6

The ADD r0, r2 instruction performs the addition of the value contents in r2 with that of r0 and replaces the value content of r0 with the result of the addition. The XCHG r0, r3 instruction exchanges the value contents of r0 with that of r3, and vice versa. The SUB r0, r6 instruction performs the subtraction of the value contents of r6 from r0 and replaces the content value in r0 with the result of the subtraction. The state of the RAT after the rename stage for each instruction is shown in FIG. 4 by array 450. Initial state 400 illustrates that the CAM bits 440 are reset to constant values out of reset. ADD instruction 410 first reads r0 and r2, which are associated with p56 and p55, respectively. ADD instruction 410 then writes to r0 which, allocates new physical register p81. XCHG instruction 420 swaps the data values of r0 and r3 which, is accomplished without altering the data array portion of the RAT or any part of the RF. One skilled in the art will recognize that ADD instruction 410 and XCHG instruction 420 can both be renamed simultaneously. The states in FIG. 4 are shown individually for ease of understanding. SUB instruction 430 source r0 is renamed to the correct physical register, p57. Therefore, reflecting the effects of XCHG instruction 420. And, SUB instruction 430 correctly renames r0 to newly allocated physical register p82.

Since the XCHG instruction is completely handled during the time of renaming, no execution resources are required. Also, no dependencies are introduced into the dataflow. Therefore, performance is maximized. In an ISA having 8 registers, as illustrated in the example above, only 6 bits of information are necessary to be read from, or written to, to accomplish the XCHG instruction. The reduction in necessary bits for read/write operations minimizes hardware requirements and also reduces power consumption.

Figure 5:
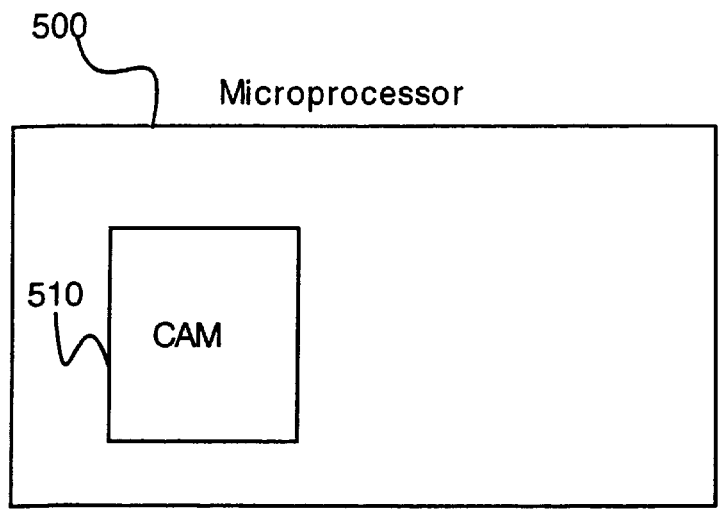
FIG. 5 illustrates a CAM embedded in a microprocessor in accordance with an embodiment of the invention.
Figure 6:
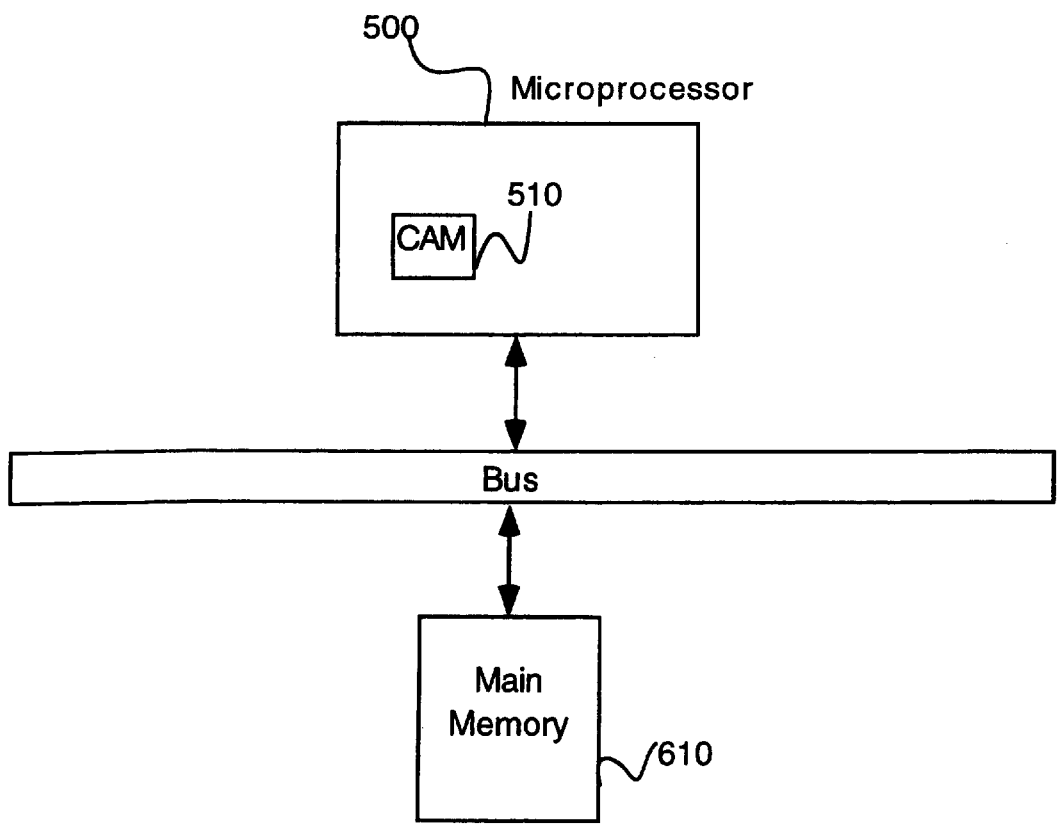
FIG. 6 illustrates a microprocessor used in a system having an entry-swapping CAM in accordance with an embodiment of the invention.

Additionally, other embodiments using the entry-swapping CAM mechanism can be integrated easily into superscalar microarchitectures because the XCHG instruction can be renamed in parallel with other instructions without requiring additional pipeline stages. Also, since devices that use the entry-swapping CAM mechanism only swap the address bits of the RAT, extra control data and functionality, such as tag comparators, can be added to each RAT entry without requiring additional logic to handle the acceleration of the XCHG instruction. This advantage is quite significant, if for example the RAT contains an associated Logical Scoreboard that is updated by comparators connected to the physical register numbers stored in each entry of the RAT. Further, for ease of understanding, FIG. 5 illustrates an embedded CAM 510 that is part of microprocessor 500. FIG. 6 illustrates microprocessor 500 as part of a system that includes a bus and main memory 610. In the embodiment illustrated in FIG. 6, microprocessor 500 communicates with main memory 610 via the bus.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those of ordinary skill in the art.

What is claimed is:

1. An apparatus comprising:
   a register alias table data array having at least one read port, at least one write port, and a plurality of address entries, and
   a content addressable memory coupled to the register alias table data array,
   the content addressable memory comprising a plurality of comparator arrays storing:
   at least one read address,
   at least one write address, and
   a plurality of swap addresses,
   wherein a plurality of logical register numbers are used as content addressable memory input addresses, and operation of the content addressable memory is completed in a first phase and a second phase of a clock cycle.

2. The apparatus of claim 1, wherein the plurality of comparator arrays compare the at least one read address, the at least one write address, and the plurality of swap addresses with data instructions during a particular clock cycle.

3. The apparatus of claim 1, wherein the plurality of comparator arrays are capable of swapping logical register numbers corresponding to at least two entries in the register alias table data array.

4. The apparatus of claim 1, wherein the content addressable memory swaps logical register numbers corresponding to at least two of the plurality of address entries to accomplish functionality of an exchange (XCHG) instruction.

5. The apparatus of claim 4, wherein results of swapping logical register numbers corresponding to at least two entries in the register alias table data array are dispatched in parallel with other instructions.

6. A method comprising:

initializing contents of a content addressable memory, providing the content addressable memory to a register alias table data array, using a plurality of logical register numbers as input addresses to the content addressable memory, performing a comparison of read, write and swap addresses with data instructions during a particular clock cycle, performing a read of the register alias table data array, performing a swap of logical register numbers corresponding to at least two entries in the register alias table data array indicated by the swap addresses.

7. The method of claim 6, wherein said performing a comparison is completed in one phase of a clock cycle.

8. The method of claim 7, wherein said performing a swap of logical register numbers is completed in another phase of a clock cycle.

9. The method of claim 8, wherein results of said performing a swap of logical register numbers affects instructions dispatched during a next clock cycle.

10. The method of claim 9, wherein the results of performing a swap of logical register numbers are used to simultaneously read the register alias table data array and swap the logical register numbers corresponding to the at least two entries indicated by the swap addresses.

11. The method of claim 6, wherein said performing a swap of logical register numbers implements the functionality of an exchange (XCHG) instruction.

12. The method of claim 10, wherein the results of said performing a swap of logical register numbers are dispatched in parallel with other instructions.

13. A system comprising:

a microprocessor, a bus coupled to the microprocessor, a memory coupled to the bus and the microprocessor, a register alias table data array having at least one read port, at least one write port and a plurality of address entries, said register alias table data array coupled to the microprocessor, and a content addressable memory coupled to the register alias table data array, the content addressable memory comprising a plurality of comparator arrays storing:

at least one read address, at least one write address, and a plurality of swap addresses, wherein a plurality of logical register numbers are used as content addressable memory input addresses, and operation of the content addressable memory is completed in a first phase and a second phase of a clock cycle.

14. The system of claim 13, wherein the plurality of comparator arrays compare the at least one read address, the at least one write address, and the plurality of swap addresses with data instructions during a particular clock cycle.

15. The system of claim 14, wherein the plurality of comparator arrays are capable of swapping logical register numbers corresponding to at least two entries in the register alias table data array.

16. The system of claim 13, wherein the content addressable memory swaps logical register numbers corresponding to at least two of the plurality of address entries to accomplish functionality of an exchange (XCHG) instruction.

17. The system of claim 16, wherein results of swapping logical register numbers corresponding to at least two entries in the register alias table data array are dispatched in parallel with other instructions.

18. A method comprising:

capturing dispatched instructions from a microprocessor, initializing contents of a content addressable memory, providing the content addressable memory to a register alias table data array, using a plurality of logical register numbers as input addresses to the content addressable memory, performing a comparison of read, write and swap addresses with data instructions during a particular clock cycle, performing a read of the register alias table data array, performing a swap of logical register numbers corresponding to at least two entries in the register alias table data array indicated by the swap addresses.

19. The method of claim 18, wherein said performing a comparison is completed in one phase of a clock cycle.

20. The method of claim 19, wherein said performing a swap of logical register numbers is completed in another phase of a clock cycle.

21. The method of claim 20, wherein results of said performing a swap of logical register numbers affects instructions dispatched by the microprocessor during a next clock cycle.

22. The method of claim 21, wherein the results of said performing a swap of logical register numbers are used to simultaneously read the register alias table data array and swap the logical register numbers corresponding to the at least two entries indicated by the swap addresses.

23. The method of claim 18, wherein said performing a swap of logical register numbers implements the functionality of an exchange (XCHG) instruction.

24. The method of claim 22, wherein the results of said performing a swap of logical register numbers are dispatched in parallel with other instructions.

* * * * *